United States Patent [19]

Widmann et al.

[11] Patent Number: 4,945,000

[45] Date of Patent: Jul. 31, 1990

[54] PARTICULATE THERMOSETTING ADHESIVE COMPOSITIONS

[75] Inventors: Marcel Widmann, Belleville; James H. Hickey, Picton, both of Canada

[73] Assignee: BTL Specialty Resins Corp., Toledo, Ohio

[21] Appl. No.: 297,691

[22] Filed: Jan. 18, 1989

[51] Int. Cl.$^5$ .................. B32B 19/02; C08K 9/04; C09J 1/00
[52] U.S. Cl. ........................... 428/407; 428/403; 428/404; 428/405; 156/283; 523/213
[58] Field of Search ............ 428/403, 404, 405, 407, 428/402.24; 156/283, 284; 523/213; 427/221

[56] References Cited

U.S. PATENT DOCUMENTS

| | | | |
|---|---|---|---|
| 3,328,339 | 6/1967 | Tierney | 523/213 |
| 4,112,185 | 9/1978 | Meiller | 428/403 |
| 4,457,978 | 7/1984 | Wawzonek | 524/14 |

*Primary Examiner*—George F. Lesmes
*Assistant Examiner*—Christopher Brown
*Attorney, Agent, or Firm*—Rodman & Rodman

[57] ABSTRACT

Particulate thermosetting adhesive compositions exhibiting heat softening properties and capable of resisting penetration into porous substrates can be made at significantly lower cost than conventional adhesives by coating inorganic carrier particles with a previously prepared liquid thermosetting resin and spray drying the resulting mixture.

11 Claims, No Drawings

PARTICULATE THERMOSETTING ADHESIVE COMPOSITIONS

BACKGROUND OF THE INVENTION

1. Field Of The Invention

This invention relates to particulate thermosetting adhesives and methods for their preparation. More specifically, the invention relates to methods for preparing solid particles comprising an inner carrier substance and an outer coating of thermosetting resin.

2. Description Of The Prior Art

Particulate thermosetting adhesives in the form of finely divided powders are extensively used as binders in the manufacture of many industrial composites. Powdered phenolic adhesives are used in the manufacture of composite wood products such as waferboard, particleboard, fiberboard and the like. Powdered melamine adhesives are used in the manufacture of molded wood products and molding compounds. A description of the processes involved in the manufacture of such composites can be found in "Phenolic Resins" by Andre Knop and Louis A. Pilato, Springer Verlang Berlin Heidelberg, 1985.

A common factor in all these processes is the application of sufficient heat to the composite to allow the thermosetting adhesive powder contained therein to melt, thereby wetting the substrate surface and subsequently solidifying to an infusible mass bonding the wetted surfaces together.

Thus, thermosetting adhesives suitable for the manufacture of industrial composites must exhibit heat softening properties to effectively and uniformly coat and wet the substrate surface. However, in the manufacture of composites containing porous substrates such as wood or cotton based materials, adhesives with heat softening properties will not only coat and wet the substrate surfaces, but will also penetrate and absorb through these surfaces. This effectively reduces the amount of adhesive available at the substrate interface, thereby weakening the strength of the composite. While an increase in the amount of adhesive used in the composite would compensate for this loss, such measures are wasteful and result in increased costs.

U.S. Pat. No. 4,424,300 to Udvardy et al discloses a method of making a spray dried phenolic resole resin having heat softening and fast cure properties. The heat softening properties are imparted by incorporating in a separate step a novolac resin into a resole resin prior to spray drying. While this method provides for improved heat softening properties of the adhesive, it also results in increased penetration of the adhesive into porous substrates and consequently reduced strength of the composite. Additionally, the manufacture in separate steps of a novolac and a resole, with subsequent blending of the two is time consuming and wasteful.

U.S. Pat. No. 4,098,770 to Berchem et al discloses a method of making a spray dried phenolic resin with a non-phenolic polyhydroxy compound added thereto prior to spray drying. The non-phenolic polyhydroxy compound significantly improves the heat softening properties of the resin, but also results in increased penetration of the resin in the case of porous substrates. Additionally, because of the humectant nature of such non-phenolic polyhydroxy compounds, spray drying of resins containing such compounds is difficult and wasteful.

U.S. Pat. No. 3,931,070 to Bond et al discloses a phenol-formaldehyde resin plywood adhesive containing at least 1% of a sodium lignosulfate and up to 1% of a trialkyl phosphate. The addition of trialkyl phosphate and lignosulfate to the phenol-formaldehyde adhesive containing extenders and fillers, especially amylaceous and proteinaceous materials modifies the surface properties of the phenolic adhesive mixture to enhance the curtainability or film forming properties to provide an even, uniform coating of the adhesive on a veneer.

A significant amount of prior art also relates to the use of lignins or waste sulfite liquor as a binder additive for cellulosic material, such as, U.S. Pat. No. 4,357,454 to Holmberg et al, U.S. Pat. No. 4,324,747 to Sudan et al, U.S. Pat. No. 4,303,562 to Hollis, Jr. et al, U.S. Pat. No. 4,127,544 to Allan, U.S. Pat. No. 4,105,606 to Forss et al, U.S. Pat. No. 3,886,101 to Felicetta et al, and U.S. Pat. No. 3,864,291 to Enkvist.

SUMMARY OF THE INVENTION

Particulate thermosetting adhesive compositions exhibiting heat softening properties and capable of resisting penetration into porous substrates can be made at significantly lower cost than conventional adhesives by coating inorganic carrier particles with a previously prepared liquid thermosetting resin and spray drying the resulting mixture.

DESCRIPTION OF THE PREFERRED EMBODIMENTS

In accordance with the present invention, the particulate thermosetting adhesive composition comprises an aqueous mixture of a thermosetting resin and substantially water insoluble inorganic particulate matter having at least 50% by weight of the particles greater than 5 microns, and preferably greater than 10 microns, in the maximum particle dimension and at least 50% by weight of particles smaller than 100 microns, and preferably smaller than 70 microns, in the maximum particle dimension. The amount of water insoluble particulate matter varies from about 1 to 240 parts by weight, preferably about 5 to 100 parts by weight, to 100 parts by weight of the solids content of the thermosetting resin.

The liquid thermosetting resin is placed in a vessel under agitation. The particulate matter is added to the vessel and agitation is continued until the mixture is uniform and homogeneous. The homogeneous, aqueous mixture of particulate matter and resin is then spray dried to form the dry resin coated particulate composition.

It has also been found that an aminofunctional coupling agent, such as an organosilane or organotitanate added to the aqueous particulate thermosetting medium before spray drying the mixture, further improves the properties. The coupling agent improves the bonding between the resin and particulate matter. Organotitanates are disclosed in U.S. Pat. No. 4,069,192 to Monte et al, and organosilanes are disclosed in Katz, "Handbook of Fillers for Plastics" pp 69–70 (Van Nostrand Reinhold Co., N.Y. 1987), which are incorporated by reference herein. Preferred coupling agent include aminopropyltriethoxysilane and isopropyltri(N-diethylamino)titanate. The amount of coupling agent can vary from about 0.001 to 1%, preferably about 0.01 to 0.5% by weight of the particulate matter.

In the inventive thermosetting adhesive composition the inorganic particulate matter is essentially water insoluble and inert to the thermosetting resin. The inorganic particulate matter after spray drying serves as a carrier substance with an outer coating of essentially dry thermosetting resin. The combined material exhibits heat softening properties and resists penetration into porous substrates such as wood or cotton based materials for which it is used as a bonding agent.

Any water based, liquid thermosetting resin with a solids content of at least about 10% by weight and not exceeding about 80% by weight and preferably about 20% to 60% is suitable for this invention. Preferred resins include aldehyde condensation products with phenol, resorcinol, melamine, urea, acetone, dicyandiamide, as well as mixtures and copolymers thereof. Especially preferred are aqueous phenol-formaldehyde resole resins disclosed in Canadian Patent No. 1,160,389 and U.S. Pat. No. 4,098,770 to Berchem et al, U.S. Pat. No. 4,537,941 to Kambanis et al and U.S. Pat. No.4,324,747 to Sudan et al, which are incorporated by reference herein.

The inorganic carrier substances suitable as the particulate carrier for this invention are discrete particles of inorganic compositions or mixtures comprised of at least 50% by weight of particles greater than 5 microns, in maximum particle dimension, and at least 50% by weight of particles smaller than 100 microns in maximum particle dimension, and exhibiting a solubility in water of not more than 0.1% by weight. Preferred particles have minimum particle dimensions of at least 20 microns to a maximum of 50 microns. While the physical shape of such particles can vary, it has been found that those having a platy or spheroidal shape are particularly suitable for this invention.

Specific inorganic particles useful for this invention include inorganic oxides such as alumina and gibbsite; inorganic salts such as barites, aragonite, calcite, dolomite; and inorganic silicates such as silicates of zirconium, calcium, calcium-magnesium, alumina, magnesium, sodium-potassium-alumino, as well as hydrous silica, silica and glass; and mixtures such as flyash. Especially preferred are silica, glass and Muscovite mica.

The coupling agent to improve the adhesion of the thermosetting resin to the inorganic particulate carrier can also be incorporated into the liquid mixture either by adding the coupling agent to the mixture prior to spray drying, or by separately treating the particulate matter with the coupling agent prior to combining the particulate matter with the liquid thermosetting resin.

The process of treating particulate matter with coupling agents is described in detail in Katz et al, "Handbook of Fillers for Plastics" pages 69–70 (Van Nostrand Reinhold Co., New York, 1987).

Spray drying the thus prepared aqueous particulate containing thermosetting adhesive composition can be accomplished in any suitable device, such as in a drier equipped with a spinning disc atomizer. Inlet temperatures in the spray drier can vary from about 180° to 250° C., and outlet temperatures can vary from about 90° to 120° C. The technique of spray drying is well known and is described in detail in Perry, "Chemical Engineers' Handbook," pages 20–51 (6th edition, McGraw Hill & Co., 1984), which is incorporated by reference herein.

The spray dried adhesive compositions thus prepared are free flowing finely divided particles of the inorganic particulate matter having an outer coating of the thermosetting resin, and are useful as binders in the manufacture of Composites containing porous substrates. The average particle size distribution of the composition has 85 weight percent smaller than 74 microns, with a bulk density varying from about 0.2 to 0.4 grams per cubic centimeter.

The spray dried particulate thermosetting adhesive composition can be used in the manufacture of, for example, waferboard, particleboard, fibermat insulation boards and molded wood products. In general, the spray-dried resin is dry blended with the substrate particles, followed by the application of sufficient heat to allow the thermosetting adhesive powder contained therein to melt, thereby wetting the substrate surface and subsequently solidifying to an infusible mass bonding the wetted surface together. In addition to being a useful binder in the manufacture of composites, the particulate or powdered adhesive composition of this invention offers other important advantages over conventional powdered thermosetting adhesives, namely, lower manufacturing costs, improved drying rates and resistance to penetration of porous substrates.

The amount of particulate adhesive composition will generally vary depending upon the particular wood substrate manufactured. For example, with waferboard, the amount of adhesive composition can vary from about 1 to 4% by weight; with fibermat, it can vary from about 10 to 30% by weight; with molded wood products, it can vary from about 10 to 40% by weight; and with particle board, it can vary from about 5 to 1% by weight.

In the forest products industry, adhesive penetration is assessed on the basis of visual inspection of the glueline. In the case of waferboard, a common procedure is as follows:

1. Carefully delaminate a portion of the glueline by lifting off wafers with the help of a sharp knife. 2. Expose the delaminated piece to heat, sufficient to result in a brownish discoloration of the resin. A few minutes in a toaster oven usually suffices, thereby allowing the resin to be visually distinguishable from the wood. 3. Examine the pieces in a microscope for the following characteristics:
   a. Distinct resin particles visible—no penetration; precure.
   b. No resin particles visible, resin molten along wood fibers—satisfactory
   c. No resin visible—excessive penetration Since the cost of conventional thermosetting resin adhesives is significantly higher than many inorganic particulate substances, the incorporation of inorganic particulate substances into a thermosetting resin adhesive, in accordance with the present invention, results in correspondingly reduced cost of the adhesive without adversely affecting its performance. It has been found that the actual amount of resin used can be reduced in an amount proportional to the amount of particulate matter contained in the inventive composition.

Furthermore, in the process of converting the liquid mixture into a dry powder by spray drying, the cost of drying which is related to the amount of water that has to be removed from the mixture, is also reduced. Thus, incorporating inorganic particulate matter into the mixture in accordance with the invention, reduces the amount of water that must be removed from the mixture per unit weight of adhesive, resulting in additional cost savings.

In the examples which follow, the following test procedures were used to arrive at the disclosed values:

(a) Heat Softening Value

A pressed pellet of resin weighing 0.7 grams is placed onto a preheated hot plate at 140° C. Immediately upon placement, the pellet is covered by a 10 sq. inch glass plate centered on the pellet. A 14 pound weight is then placed upon the glass plate so that its force is perpendicular to the surface of the glass plate. Three minutes after placement of the weight, it is removed and the resin mass is examined. The heat softening value is determined as the diameter of the circular mass of resin remaining under the glass plate, expressed in millimeters.

(b) Hot Plate Cure

A mass of resin weighing 0.5 grams is placed onto a preheated hot plate at 140° C. The mass is evenly spread over a 20 square centimeter area, with a spatula, and a forceful side to side motion is applied to the mass until such time that the solidification of the resin has progressed to the point where it can no longer be moved with the spatula. The hot plate cure is determined as the time elapsed between placement of the resin onto the hot plate and solidification, expressed in seconds.

(c) Thickness Swell and Moisture Absorption

Specimens measuring three inches by ten inches are submerged in water at 21° C. for two hours. They are then removed and the excess water is dried off with a towel. The initial weight and thickness of the specimens are determined, followed by reimmersion of the specimens in water at 21° C. for 22 hours. The specimens are then removed, excess water dried off with a towel, and final weight and thickness determined. Thickness swell and moisture absorption are expressed as percentage increase in thickness and weight respectively.

(d) Internal Bond

The procedure used was in conformance to the Canadian Standards Association (CSA) Standard Test Methods for Mat-Formed Wood Particleboards and Waferboard CAN3-0188.0-M78, par. 6.7, pages 19–20 (1978)

(e) Viscosity

Viscosity was measured by Gardner-Holt comparator tubes and expressed in letters.

(f) Solid Content

One gram of resin is deposited onto a glass dish and placed into an oven at 105° C. for 3 hours. The dish is then allowed to cool to 25° C. in a desiccator and the weight of the remaining resin residue is determined. The solid content is the amount of residue compared to the original weight of resin sample, expressed as a percentage.

EXAMPLE 1

(a) Preparation of liquid thermosetting resin A:

To 28.35 grams of a 45% formaldehyde solution were added 23.25 grams of phenol and 17.03 grams of water. The mixture was then heated to 40° C. and 1.88 grams of 50% caustic soda solution were added under agitation. The mixture was heated to 65° C. and held at that temperature for 90 minutes. The mixture was then heated to 85° C. and held at that temperature for 80 minutes. The mixture was then cooled by vacuum refluxing to 75° C. and maintained at this temperature until the mixture attained a Gardner-Holt viscosity of N. The mixture was then cooled over a period of 1 to 2 hours to 30° C., followed by the addition of 5.08 grams of hexamethylene tetramine, 1.55 grams of 50% caustic soda solution, 22.45 grams of water and 0.40 grams of isopropylaminedodecylbenzenesulfonic acid. The resin thus produced had a Gardner-Holt viscosity of B and a solids content of 38%.

(b) Preparation of powdered thermosetting adhesive A:

To 100 grams of liquid thermosetting resin A were added 16.28 grams of Muscovite mica having 100% by weight of particles less than 100 microns in maximum particle dimension and 80% by weight of particles greater than 10 microns in maximum particle dimension, and 0.055 grams of aminopropyltriethoxysilane. The resulting mixture was spray dried in a disc atomizing drier, yielding a free flowing powder with a heat softening value of 45 millimeters, a bulk density of 0.25 grams per cubic centimeter, and hot plate cure of 42 seconds.

(c) Preparation of powdered thermosetting adhesive B:

To 100 grams of liquid thermosetting resin A were added 25.3 grams of glass beads having a diameter of 44 microns, (Potter Industries, La Prairie, Quebec, Canada) and 0.063 grams of aminopropyltriethoxysilane. The resulting mixture was spray dried in a disc atomizing drier, yielding a free flowing powder with heat softening value of 42 millimeters and a hot plate cure of 38 seconds.

(d) Preparation of powdered thermosetting adhesive C:

To 100 grams of liquid thermosetting resin A were added 9.5 grams of ground silica having 99.7% by weight of particles less than 100 microns and having 70% by weight of particles greater than 10 microns in maximum particle dimension, and 0.048 grams of aminopropyltriethoxysilane. The resulting mixture was spray dried in a disc atomizing drier, yielding a free flowing powder with a heat softening value of 46 millimeters and a hot plate cure of 44 seconds.

(e) Preparation of powdered thermosetting adhesive D (control—not containing particulate matter):

Liquid thermosetting resin A was spray dried in a disc atomizing drier, yielding a free flowing powder with heat softening value of 48 millimeters and a hot plate cure of 46 seconds.

EXAMPLE 2

(a) Preparation of liquid thermosetting resin E:

To 2410 grams of a 45% formaldehyde solution were added 60 grams of methanol and 3.7 grams of 25% caustic soda solution. The mixture was heated to 35° C. and 2170 grams of melamine were added. The mixture was then heated to 93° C. and held at that temperature to a Gardner-Holt viscosity of A. 360 grams of water were then added, and the mixture was cooled to 30° C. yielding a resin with a solids content of 51%.

(b) Preparation of powdered thermosetting adhesive F:

To 100 grams of liquid thermosetting resin E were added 12.75 grams of glass beads having a diameter of 44 microns (Potter Industries, La Prairie, Quebec, Canada), 0.063 grams of aminopropyltriethoxysilane and 12.5 grams of water. The resulting mixture was spray dried in a disc atomizing drier, yielding a free flowing powder with heat softening value of 78 millimeters and a hot plate cure of 390 seconds.

(c) Preparation of powdered thermosetting adhesive G:

To 100 grams of liquid thermosetting resin E were added 16.7 grams of Muscovite mica having 100% by weight of particles less than 100 microns in maximum particle dimension and 80% by weight of particles greater than 10 microns in maximum particle dimension, 0.067 grams of aminopropyltriethoxysilane and 17.0 grams of water. The resulting mixture was spray dried in a disc atomizing drier yielding a free flowing powder with a heat softening value of 67 millimeters and a hot plate cure of 320 seconds.

(d) Preparation of powdered thermosetting adhesive H (control—not containing particulate matter):

Liquid thermosetting resin E was spray dried in a disc atomizing drier, yielding a free flowing powder with a heat softening value of 81 millimeters and hot plate cure of 430 seconds.

EXAMPLE 3

Aspen wood flakes were sprayed with 1.5% molten slack wax and mixed with 2.5% of powdered thermosetting adhesive. Composites were made by pressing these flakes at 210° C. for 5 minutes to yield boards 7/16 inch thick with a density of 40 pounds per cubic foot. Powdered thermosetting adhesives A, B, C, and D were evaluated in this manner and the following results were obtained:

| Board No. | Adhesive Bond | Internal Bond, psi | Thickness Swell % | Moisture Abs. % |
| --- | --- | --- | --- | --- |
| 1 | A | 56 | 16 | 40 |
| 2 | B | 69 | 14 | 28 |
| 3 | C | 62 | 17 | 38 |
| 4 | D | 58 | 18 | 42 |

EXAMPLE 4

Composites were made by dry blending 60 grams of softwood flour with 22 grams of hardwood flour and 18 grams of thermosetting adhesive resin and pressing this dry blend at 165° C. for 7.5 minutes to yield boards ½ inch thick and having a density of 60 pounds per cubic foot. Powdered thermosetting adhesives F, G, and H were evaluated in this manner and the following results were obtained:

| Board No. | Adhesive | Internal Bond, psi |
| --- | --- | --- |
| 1 | F | 270 |
| 2 | G | 310 |
| 3 | H | 290 |

EXAMPLE 5

Aluminum block composites were made by placing one gram of resin onto a 1 inch by 1 inch surface of a ½ inch thick block of aluminum. A second block of aluminum, identical to the first, was then placed on top and the assembly was pressed at 140° C. for 4 minutes. Thermosetting powdered adhesives A, B, C and D were evaluated in this manner and the following results were obtained:

| Composite No. | Adhesive | Internal Bond, psi |
| --- | --- | --- |
| 1 | A | 850 |
| 2 | B | 910 |
| 3 | C | 820 |
| 4 | D | 812 |

The particulate thermosetting resins of the present invention produced an internal bond on a non-porous substrate that surprisingly resulted in an increase in strength. Other suitable non-porous substrates of a metallic nature that can be used include brass, copper, steel, chromium, lead, silver, zinc, gold, platinum, magnesium, titanium, and the like. Suitable non-porous plastic materials that can be used include molded resin products of melamines, phenolics, polyesters and the like.

What is claimed is:

1. A particulate thermosetting adhesive composition having heat softening properties and the ability to resist penetration in a porous substrate, comprising individual free flowing finely divided discrete particles of substantially water insoluble inorganic particulate matter inert to and coated with a thermosetting resin comprising at least one aldehyde condensation product selected from the group consisting of phenol, resorcinol, melamine, urea, acetone, dicyandiamide, and mixtures thereof; and wherein the amount of particulate matter varies from about 1 to 240 parts by weight per 100 parts by weight of the solids content of the thermosetting resin.

2. The composition of claim 1, wherein the proportion of particulate matter varies from about 5 to 100 parts by weight.

3. The composition of claim 1, also including an aminofunctional coupling agent selected from the group consisting of organosilanes, organotitanates and mixtures thereof, wherein the coupling agent varies from about 0.001 to 1.0% by weight of the particulate matter.

4. The composition of claim 3, wherein the coupling agent varies from about 0.01 to 0.5% by weight of the particulate matter.

5. The composition of claim 3, wherein the coupling agent is selected from the group consisting of aminopropyltriethoxysilane, isopropyltri(N-diethylamino)-titanate and mixtures thereof.

6. The composition of claim 1, wherein the solids content varies from about 20 to 60% by weight.

7. The composition of claim 1, wherein the particulate matter comprises discrete particles of inorganic compositions having at least 50% by weight of particles greater than 5 microns in the maximum particle dimension and a solubility in water not more than 0.1% by weight, and are selected from the group consisting of inorganic oxides, inorganic salts, inorganic silicates, and mixtures thereof.

8. The composition of claim 1, wherein the free flowing, finely divided individual discrete particles coated with the thermosetting resin are obtained by spray drying an aqueous mixture of the particulate matter and resin to form the dry resin coated particulate composition.

9. The composition of claim 1, wherein the thermosetting resin is water soluble.

10. The composition of claim 1, wherein at least 50% by weight of the water insoluble inorganic particulate matter comprises particles greater than 5 microns and at least 50 weight % comprises particles smaller than 100 microns, in the maximum particle dimension.

11. The composition of claim 1, wherein the thermosetting resin initially is in a liquid state and has a solids content of about 10 to 80% by weight.

* * * * *

UNITED STATES PATENT AND TRADEMARK OFFICE
CERTIFICATE OF CORRECTION

PATENT NO. : 4,945,000

DATED : July 31, 1990

INVENTOR(S) : Widmann et al.

It is certified that error appears in the above-identified patent and that said Letters Patent is hereby corrected as shown below:

At column 4, line 28, change "1%" to -- 10% --.

Signed and Sealed this

Nineteenth Day of November, 1991

Attest:

HARRY F. MANBECK, JR.

*Attesting Officer*  *Commissioner of Patents and Trademarks*